May 15, 1951          A. S. BROWN          2,552,839
MEANS FOR MOLDING UNDERCUT KNOB HANDLES OR OTHER
UNDERCUT PORTIONS UPON GLASS ARTICLES
Filed Aug. 24, 1945          3 Sheets-Sheet 1

INVENTOR
ARTHUR SELWYN BROWN
By
ATTORNEY

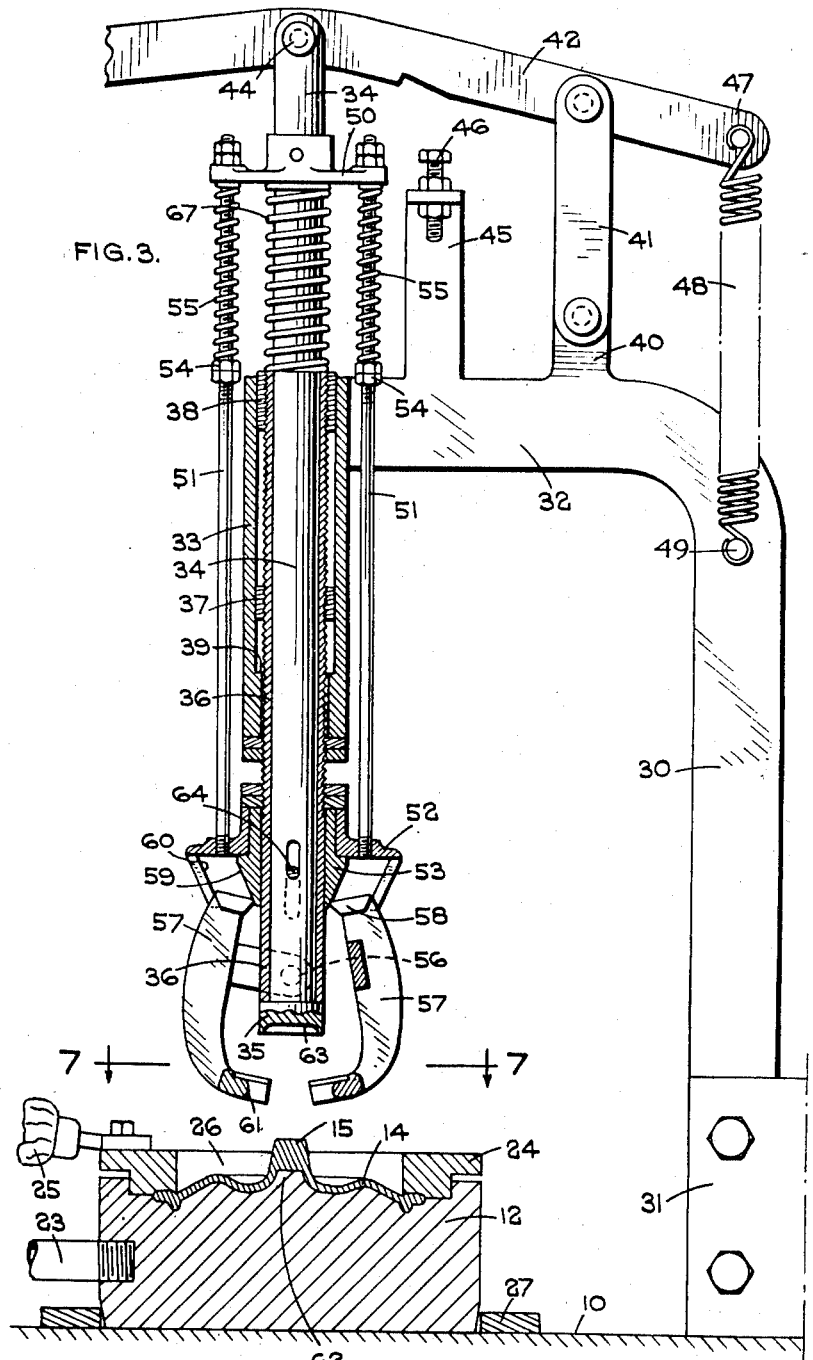

May 15, 1951 A. S. BROWN 2,552,839
MEANS FOR MOLDING UNDERCUT KNOB HANDLES OR OTHER
UNDERCUT PORTIONS UPON GLASS ARTICLES
Filed Aug. 24, 1945 3 Sheets-Sheet 3
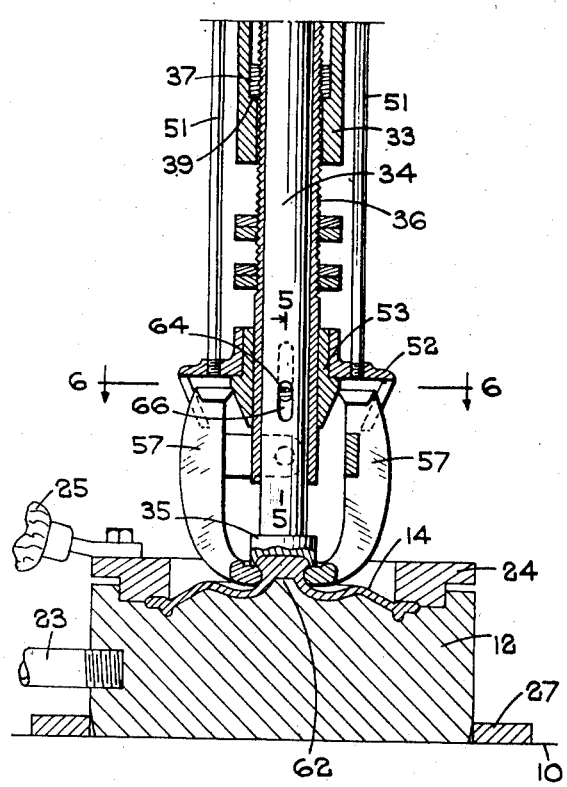
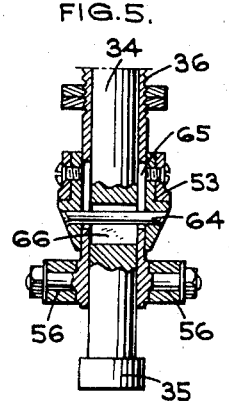
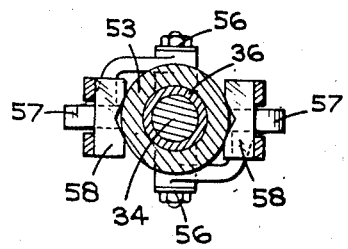
INVENTOR
ARTHUR SELWYN BROWN
his ATTORNEY.

Patented May 15, 1951

2,552,839

UNITED STATES PATENT OFFICE 2,552,839

MEANS FOR MOLDING UNDERCUT KNOB HANDLES OR OTHER UNDERCUT PORTIONS UPON GLASS ARTICLES

Arthur Selwyn Brown, Bilston, England, assignor to The British Heat Resisting Glass Company, Limited, Bilston, England, a British company Application August 24, 1945, Serial No. 612,348
In Great Britain August 31, 1944

3 Claims. (Cl. 49—22)

This invention relates to means for moulding undercut knob handles or other undercut portions upon glass articles.

Hitherto it has been the usual practice to mould undercut knob handles upon glass articles, such as the lids of glass casseroles and other containers, by using a split die for shaping the side of the article where the knob handle is to be provided. This practice has certain disadvantages. For instance, small radial fins are produced on the articles by reason of the use of a split die at the handle side of the article. Further, such fins tend to increase in dimensions when using dies that have been in use for a considerable time owing to wear on the dies. Further, before the article can be removed from the dies, it is necessary to open the two halves of the split die, and before the next lid can be moulded, the two halves of the split die must be closed together again.

The object of the present invention is to provide an improved apparatus for moulding knob handles or any undercut portion of an article.

The apparatus used for producing the articles includes a press having a table on which is a lower die for shaping the underside of the article, the press having an upper die for shaping the upper side of the article, the upper die having a cavity in which the lump is formed, the upper die being mounted on the press plunger and having a reciprocating movement, and I provide the press with a sliding pin, to the lower end of which a die for producing the expansion of the end of the lump is secured, so that after the article has been formed with the lump on its upper side, and the upper die raised, the expansion-producing die is brought down to expand the upper end of the lump.

In order to do this, I provide the press with a bracket extending upwardly above the table, this bracket carrying a bearing in which the sliding pin operates, and the sliding pin may be operated by a hand or foot lever. The bracket and bearing may be situated out of line with the main press plunger, and the lower die carrying the article may be moved from this position under the main plunger of the press to a position directly under the sliding pin when the end of the lump is to be expanded.

Alternatively, the sliding pin may be mounted in a bearing carried in an arm pivoted on one of the press pillars, and this arm carrying the sliding pin and the lever to operate it may be moved pivotally around the pillar after the upper die has been raised, to bring the sliding pin directly above the lump on the article.

In either case associated with the sliding pin I provide a pair of supporting members for engaging the lower part of the lump and supporting it, while the upper part of the lump is being expanded. The supporting means may comprise a pair of levers carrying semi-circular die portions adapted to engage around the lower portion of the lump before the expansion-producing die engages the end of the lump, and the levers having the supporting means may be automatically moved into the supporting position by a cam before the expansion-producing die comes into operation.

The invention is illustrated in the accompanying drawings, wherein:

Figure 3 is a sectional view in side elevation showing the sliding pin and lump-supporting levers, and also showing the lower die and the article.

Figure 4 is a sectional view in side elevation similar to Figure 3, but showing the sliding pin, the expansion-producing die and the supporting members in the positions they occupy when operating on the lump.

Figure 1:
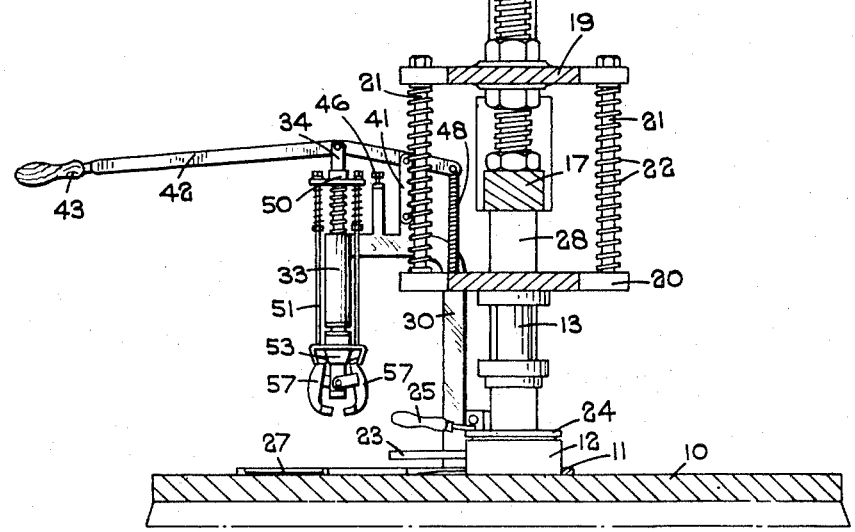
Figure 1 is a view in side elevation showing one form of the apparatus.
Figure 2:
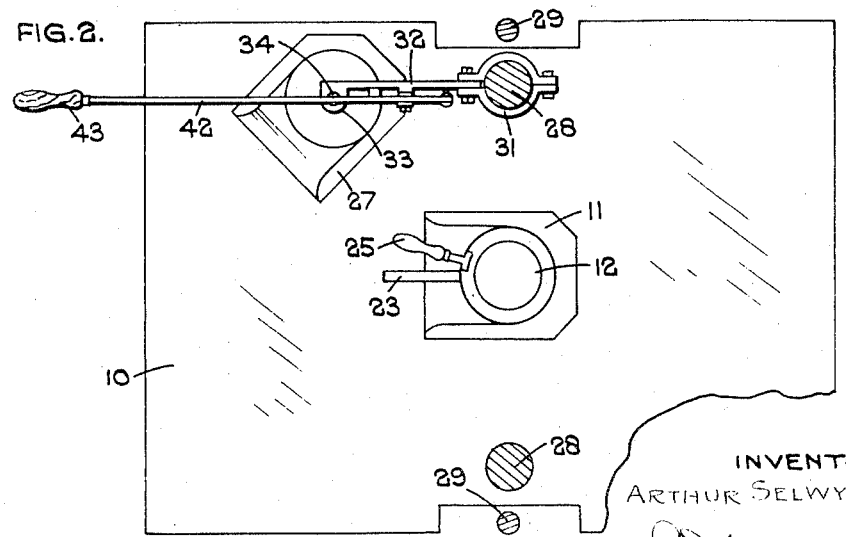
Figure 2 is a plan view showing the press table.

Figure 5 is a section on line 5—5 of Figure 4.
Figure 6 is a section on line 6—6 of Figure 4.
Figure 7 is a section on line 7—7 of Figure 3.

In the construction illustrated, the press is of known form and comprises a table 10 provided with a raised housing 11 for positioning a lower die 12 directly under the plunger 13 of the press, which plunger carries at its lower end the upper die for forming the upper side of the article 14. The upper die is not shown but it is provided with a central cavity so that the lump 15 is formed at the centre of the upper side of the article.

As usual the press comprises an upper frame including the members 16, 17, a screw 18 being mounted in this frame, and carrying an adjustable sliding plate 19 with which is associated a lower sliding plate 20 operating the plunger 13. The plates 19 and 20 are connected by bolts 21 upon which are springs 22 acting on the upper side of the plate 20.

The frame carrying the plate 20 slides on pillars 28 and is operated by means of links 29.

The lower die 12 is provided with a handle 23, and the outer part 24 of the upper die is formed as a ring having a handle 25.

The central part of the upper die is movable down into the opening 26 in the ring 24, and it bears upon the upper surface of the ring 24 when in the pressing position.

The table 10 is provided with a second housing 27 similar to the housing 11, so that after the article has been pressed and the lump 15 formed thereon, and before it has cooled, the lower die, together with the article, can be moved into the housing 27 where the expanding operation on the lump 15 is performed. To perform this operation I provide a bracket 30 clipped to the lower end of one of the pillars 28 by a clip 31. The bracket 30 has a vertical limb and a horizontal limb 32, the horizontal limb 32 carrying a vertical bearing 33 disposed directly above the housing 27 in which bearing is mounted the sliding pin 34 having at its lower end the expansion-producing die 35. The pin 34 passes through a threaded sleeve 36 having adjustable ring nuts 37, 38, which slide in the bearing 33. Near its lower end the bearing 33 is provided with an internal shoulder 39 adapted to be engaged by the under side of the nut 37 when the expansion-producing die 35 is in its operative position. The ring nut 37 can of course be adjusted on the sleeve 36.

The limb 32 of the bracket is provided with a lug 40 to which is pivoted a link 41, the upper end of which is pivoted to a lever 42 having a handle 43, the lever being used for operating the sliding pin 34, the upper end of which is formed and is pivoted to the lever at 44. The sliding pin 34 and die 35 are thus retained against rotation in the bearing 33.

The limb 32 of the bracket 30 is further provided with a lug 45 having an adjustable screw 46, the head of which forms a stop for the downward movement of the lever 42.

The end 47 of the lever 42 is connected by a spring 48 to a pin 49 on the vertical limb of the bracket 30.

Secured to the pin 34 is a plate 50 through which extend two rods 51 which screw into a plate 52 which together with a member 53 forms a cam member. The rods 51 are provided with adjustable nuts 54, between which and the under side of the plate 50 operate springs 55 which springs constitute a yieldable connection between the plate 50 and the plate 52.

Pivotally mounted at 56 on trunnions provided on the sleeve 36 are two levers 57. Each of these levers has a portion 58 engaging the cam surfaces 59, 60, and the lower ends of the levers 57 are each formed with a semi-circular portion 61 for engaging around the lower part of the lump 15 of the article, these portions being shaped for supporting the lower part of the lump, while the upper part of the lump is expanded by the die 35.

It will be observed that the supporting portions 61 extend around the lump both above and below the upper end of the central projecting portion 62 of the lower die.

The lower side of the expansion-producing die 35 is recessed as shown at 63.

The inner cam part 53 is mounted on a pin 64 extending through slots 65 in the sleeve 36, and also extending through a slot 66 in the pin 34. Between the top of the sleeve 36 and the plate 50 a compression spring 67 is provided so that the downward movement of the pin 34 is transmitted to the sleeve through this compression spring. This allows the pin to continue to move downwardly after the sleeve has come to rest by reason of the fact that the lower side of the nut 37 has come into contact with the shoulder 39.

In operation after the article has been moulded in the main part of the press and the lump 15 formed, the die 12 and the article are moved to the housing 27 so that the lump is brought axially under the pin 34. The lever 42 is then operated, and at first the pin 34, the sleeve 36 and the cam 59, 60, together with the levers 57, all move down together. When the lower ends 61 of the levers 57 arrive at the level of the upper end 62 of the centre of the lower die, the motion of the sleeve 36 is arrested by the nut 37 coming into contact with the shoulder 39. Thereafter the pin 34 and the cam 59, 60 continue to move downwardly. The levers 57, however, are pivoted to the now stationary sleeve so that the cams act on the upper ends of the levers and force the surfaces 61 into engagement with the lower part of the lump 15 around the part 62 of the lower die. The ends of the part 61 finally come into contact, causing further pivotal movement of the levers 57 to be arrested and also arresting the downward movement of the members 52, 53. The pin 34 continues to move downwardly until it engages the top of the lump 15 and expands it. Downward movement of the pin 34 is arrested by the lever 42 coming into contact with the adjustable stop 46.

Instead of providing the bracket 30, 32, the bearing 33 and all the parts associated with it, including a lever such as 42, may be mounted upon an arm pivotally mounted upon the pillar 28, the whole assembly being capable of being swung round the pillar until the axis of the pin 34 coincides with the axis of the plunger 13. With this arrangement the second housing 27 is unnecessary, as the expansion of the lump 15 is effected while the lower die is still in the housing 11 and after the main plunger of the press has been raised out of the way.

What I claim then is:

1. In a moulding press for moulding undercut portions upon glass articles, a table, a housing on the table for positioning a lower die, a bracket having a bearing disposed directly above the housing, a pin slidable in the said bearing, said pin carrying a die at its lower end adapted to engage the end of a preformed lump upon a glass article supported on the lower die, a sleeve having a portion surrounding the lower part of the pin and relatively slidable along the pin, a pair of levers pivoted on the lower part of the sleeve, the said levers having portions adapted to engage and support the sides of the preformed lump before the die at the lower end of the pin engages the end of the lump, means for reciprocating the said pin in the said bearing and yielding connecting means operatively connected between the pin and the said levers for operating the said levers to engage and support the sides of the preformed lump.

2. In a moulding press for moulding undercut portions upon glass articles, a table, a housing on the table for positioning a lower die, a bracket having a bearing disposed directly above the housing, the said bearing having an internal shoulder near its lower end, a threaded sleeve in the said bearing, a pair of spaced nuts on the sleeve, the said nuts engaging the interior of the bearing and being slidable therein, a pin slidably mounted in the said sleeve, said pin carrying a die at its lower end adapted to engage the end of a preformed lump upon a glass article supported on the lower die, a plate secured to the said pin above the said sleeve and bearing, a spring acting between one end of the said sleeve and the said plate, a cam slidably mounted on the said sleeve below the said bearing, rods operatively connecting said cam and the plate on the said pin, the rods extending through the plate, springs on the said rods acting between the plate and adjustable nuts on the rods to provide a yieldable connection between the plate and the cam to operate the cam, a pair of levers pivoted on the lower part of the sleeve, the said levers having portions adapted to engage and support the sides of the preformed lump before the die at the lower end of the pin engages the end of the lump, means for reciprocating the said pin in the said bearing, one of the said nuts in the sleeve engaging the said internal shoulder to arrest downward movement of the sleeve whilst permitting the pin to continue, the said cam co-operating with the said levers to engage the sides of the preformed lump.

3. In a moulding press for moulding undercut portions upon glass articles, a table, a housing on the table for positioning a lower die, a bracket having a bearing disposed directly above the housing, a pin slidable in the said bearing, said pin carrying a die at its lower end adapted to engage the end of a preformed lump upon a glass article supported on the lower die, a sleeve having a portion surrounding the lower part of the pin and relatively slidable along the pin, a pair of levers pivoted on the lower part of the sleeve, the said levers having portions adapted to engage and support the sides of the preformed lump before the die at the lower end of the pin engages the end of the lump, means for reciprocating the said pin in the said bearing comprising, an operating lever pivoted to the upper end of the pin, a link pivoted to the lever and the bracket and a stop on the said bracket for limiting the movement of the lever.

ARTHUR SELWYN BROWN.

REFERENCES CITED

The following references are of record in the file of this patent:

UNITED STATES PATENTS

| Number | Name | Date |
| --- | --- | --- |
| 463,646 | Pease | Nov. 24, 1891 |
| 519,113 | Grebe | May 1, 1894 |
| 1,159,853 | Madden | Nov. 9, 1915 |
| 2,335,419 | Johnston | Nov. 30, 1943 |
| 2,433,399 | Roessler et al. | Dec. 30, 1947 |

FOREIGN PATENTS

| Number | Country | Date |
| --- | --- | --- |
| 339,479 | France | Apr. 19, 1904 |
| 339,484 | Great Britain | Dec. 11, 1930 |